US012626535B2

(12) United States Patent
Okamoto et al.

(10) Patent No.: US 12,626,535 B2
(45) Date of Patent: May 12, 2026

(54) POSTURE ESTIMATING DEVICE, POSTURE ESTIMATING SYSTEM, AND POSTURE ESTIMATING METHOD

(71) Applicant: ASICS CORPORATION, Kobe (JP)

(72) Inventors: Toshiaki Okamoto, Kobe (JP); Satoru Abe, Kobe (JP); Shunsuke Yamagata, Kobe (JP); Masanori Sakaguchi, Kobe (JP)

(73) Assignee: ASICS CORPORATION, Kobe (JP)

( * ) Notice: Subject to any disclaimer, the term of this patent is extended or adjusted under 35 U.S.C. 154(b) by 0 days.

(21) Appl. No.: 18/662,409

(22) Filed: May 13, 2024

(65) Prior Publication Data

US 2024/0386751 A1     Nov. 21, 2024

(30) Foreign Application Priority Data

May 16, 2023     (JP) ................................. 2023-080778

(51) Int. Cl.
    *G06V 40/20*        (2022.01)
    *G06T 7/73*         (2017.01)
(52) U.S. Cl.
    CPC ................ *G06V 40/25* (2022.01); *G06T 7/73* (2017.01); *G06T 2207/20081* (2013.01); *G06T 2207/30196* (2013.01)
(58) Field of Classification Search
    CPC . G06V 40/25; G06T 7/73; G06T 2207/20081; G06T 2207/30196;

(Continued)

(56) References Cited

U.S. PATENT DOCUMENTS

2021/0141443 A1     5/2021   Fukumoto et al.
2021/0166479 A1     6/2021   Fukumoto et al.
                    (Continued)

FOREIGN PATENT DOCUMENTS

CN       107890166 A  *  4/2018   ............. A43B 17/00
CN       112560959 A  *  3/2021   ............. G06F 18/22
JP       2023-016825 A     2/2023

OTHER PUBLICATIONS

English Translation CN112560959 (Year: 2021).*

(Continued)

*Primary Examiner* — Fernando Alcon
(74) *Attorney, Agent, or Firm* — Studebaker Brackett PLLC

(57)     ABSTRACT

A posture estimating device includes: at least one sensor attached to the person to be measured, the at least one sensor acquiring walking data based on an acceleration of three axes and an angular velocity of the three axes at at least one location of the person to be measured; a processing circuitry that estimates, using an estimation model trained by machine learning, the whole body posture of the person to be measured during the predetermined motion from the walking data acquired by the sensor; and an output device that outputs estimation data. The estimation model is generated in advance by training by machine learning based on the walking data acquired by the sensor during the predetermined motion and based on posture data obtained by measuring the whole body posture of the person to be measured at a timing when the walking data is acquired.

9 Claims, 13 Drawing Sheets

(58) Field of Classification Search

CPC ..... A61B 5/112; A61B 5/1128; A61B 5/1116;
A61B 5/1117; A61B 5/6802; A61B
5/6807; A61B 5/7246; A61B 5/7267;
A61B 2562/0219

See application file for complete search history.

(56) References Cited

U.S. PATENT DOCUMENTS

| | | | | |
|---|---|---|---|---|
| 2021/0186141 | A1* | 6/2021 | Roh | A61B 5/0051 |
| 2022/0000429 | A1* | 1/2022 | Huang | A61B 5/1038 |
| 2023/0165538 | A1* | 6/2023 | Nematihosseinabadi | G16H 50/80 600/529 |
| 2023/0218418 | A1* | 7/2023 | Kwon | A61B 5/1116 602/5 |
| 2023/0397839 | A1* | 12/2023 | Wang | A61B 5/7267 |
| 2023/0397879 | A1* | 12/2023 | Wang | A61B 5/4571 |
| 2024/0188851 | A1* | 6/2024 | Wang | A61B 5/1118 |
| 2024/0212195 | A1* | 6/2024 | Sarandi | G01S 17/89 |
| 2025/0031995 | A1* | 1/2025 | Huang | A61B 5/11 |
| 2025/0046464 | A1* | 2/2025 | Huang | G06N 20/00 |

OTHER PUBLICATIONS

English CN107890166 (Year: 2018).*

Chen Siyu et al., "Real-Time Walking Gait Estimation for Construction Workers using a Single Wearable Inertial Measurement Unit (IMU)", 2021 IEEE/ASME International Conference on Advanced Intelligent Mechatronics (AIM), Jul. 12, 2021, pp. 753-758.

Mollyn Vimal et al., "IMUPoser: Full-Body Pose Estimation using IMUs in Phones, Watches, and Earbuds", Proceedings of the 21st Annual International Conference on Mobile Systems, Applications and Services, ACMPUB27, Apr. 19, 2023, pp. 1-12.

The extended European search report issued by the European Patent Office on Jun. 14, 2024, which corresponds to European Patent Application No. 24174929.0-1113 and is related to U.S. Appl. No. 18/662,409.

Communication pursuant to Article 94(3) EPC issued by the European Patent Office on Mar. 10, 2026, which corresponds to European Patent Office No. 24174929.0-1113 and is related to U.S. Appl. No. 18/662,409.

Qiu Sen et al., "Multi-sensor information fusion based on machine learning for real applications in human activity recognition: State-of-the-art and research challenges", Information Fusion, Elsevier, US, vol. 80, Nov. 13, 2021, pp. 241-265.

Kumano Yuji et al., "Estimating Whole-Body Walking Motion from Inertial Measurement Units at Wrist and Heels Using Deep Learning", International Journal of Automation Technology, vol. 17, No. 3, May 5, 2023, pp. 217-225.

Yeung Ted et al., "Personalized Machine Learning Approach to Estimating Knee Kinematics Using Only Shank-Mounted IMU", IEEE Sensors Journal, vol. 23, No. 11, Apr. 19, 2023, pp. 12380-12387.

* cited by examiner

ACQUIRE SKELETAL COORDINATE DATA

ACQUIRE WALKING DATA

ESTIMATE WHOLE BODY POSTURE FROM WALKING DATA

POSTURE ESTIMATING DEVICE, POSTURE ESTIMATING SYSTEM, AND POSTURE ESTIMATING METHOD

REFERENCE TO RELATED APPLICATIONS

This nonprovisional application is based on Japanese Patent Application No. 2023-080778 filed on May 16, 2023 with the Japan Patent Office, the entire contents of which are hereby incorporated by reference.

BACKGROUND

Technical Field

The present disclosure relates to a posture estimating device, a posture estimating system, and a posture estimating method.

Background Information

In order to improve the form of walking or running, it is necessary to continuously measure a whole body posture during walking or running. In addition, studies for detecting a mental disease from a posture during walking and estimating a risk of fall have also been conducted, and it is necessary to measure a posture during walking on a daily basis in these studies. Known examples of a method of measuring the whole body posture include a method using motion capture, a method using a moving image, and a method using a wearable device.

For example, Japanese Patent Laying-Open No. 2023-16825 discloses a system for measuring a whole body posture using a wearable device. According to this system, six sensor devices are attached respectively to six sites of a body of a person to be measured, specifically, joint sites serving as a reference of the body (for example, the waist or the head), or the vicinities of ends of the body (wrist, ankle, head, etc.), and the whole body posture is measured on the basis of measurement values from the sensor devices.

SUMMARY

However, in the method using motion capture and the method using a moving image, it is necessary to continuously capture the whole body with the whole body always included in the imaging range. It is difficult to continuously capture the whole body while the whole body is always included in the imaging range in order to continuously grasp the whole body posture on a daily basis. On the other hand, in the method using a wearable device, since the posture can be measured by attaching the wearable device to a person to be measured, it is suitable to continuously grasp the posture on a daily basis. However, it is only possible to grasp a partial posture including a part to which the wearable device is attached. Therefore, in order to grasp the whole body posture using the wearable device, it is necessary to wear many sensor devices at joint sites and the vicinities of ends of the body as disclosed in Japanese Patent Laying-Open No. 2023-16825, and thus it is difficult to continuously wear many sensors to grasp the whole body posture on a daily basis.

The present disclosure has been made to solve such a problem, and an object thereof is to provide a posture estimating device, a posture estimating system, and a posture estimating method capable of continuously grasping a whole body posture on a daily basis.

A posture estimating device according to an aspect of the present disclosure is a posture estimating device that estimates a whole body posture of a person to be measured during a predetermined motion. The posture estimating device includes: at least one sensor attached to the person to be measured, the at least one sensor acquiring measurement data based on an acceleration of three axes and an angular velocity of the three axes at at least one location of the person to be measured; a processing circuitry that estimates, using an estimation model trained by machine learning, the whole body posture of the person to be measured during the predetermined motion from the measurement data acquired by the sensor; and an output device that outputs estimation data of the whole body posture of the person to be measured that has been estimated by the processing circuitry. The estimation model is generated in advance by training by machine learning based on the measurement data acquired by the sensor during the predetermined motion and based on posture data obtained by measuring the whole body posture of the person to be measured at a timing when the measurement data is acquired. A posture estimating system according to an aspect of the present disclosure includes: the measuring device that measures posture data; and the posture estimating device described above, in which the posture data measured by the measuring device is used when the estimation model is trained by machine learning.

A posture estimating method according to an aspect of the present disclosure is a posture estimating method for estimating a whole body posture of a person to be measured during a predetermined motion. A posture estimating method includes: acquiring, from at least one sensor attached to the person to be measured, measurement data based on an acceleration of three axes and an angular velocity of the three axes at at least one location of the person to be measured; estimating, using an estimation model trained by machine learning, the whole body posture of the person to be measured during the predetermined motion from the measurement data acquired by the sensor; and outputting estimation data of the whole body posture of the person to be measured that has been estimated. The estimation model is generated in advance by training by machine learning based on the measurement data acquired by the sensor during the predetermined motion and based on posture data obtained by measuring the whole body posture of the person to be measured at a timing when the measurement data is acquired.

The foregoing and other objects, features, aspects and advantages of the present invention will become more apparent from the following detailed description of the present invention when taken in conjunction with the accompanying drawings.

DETAILED DESCRIPTION

Figure 1:
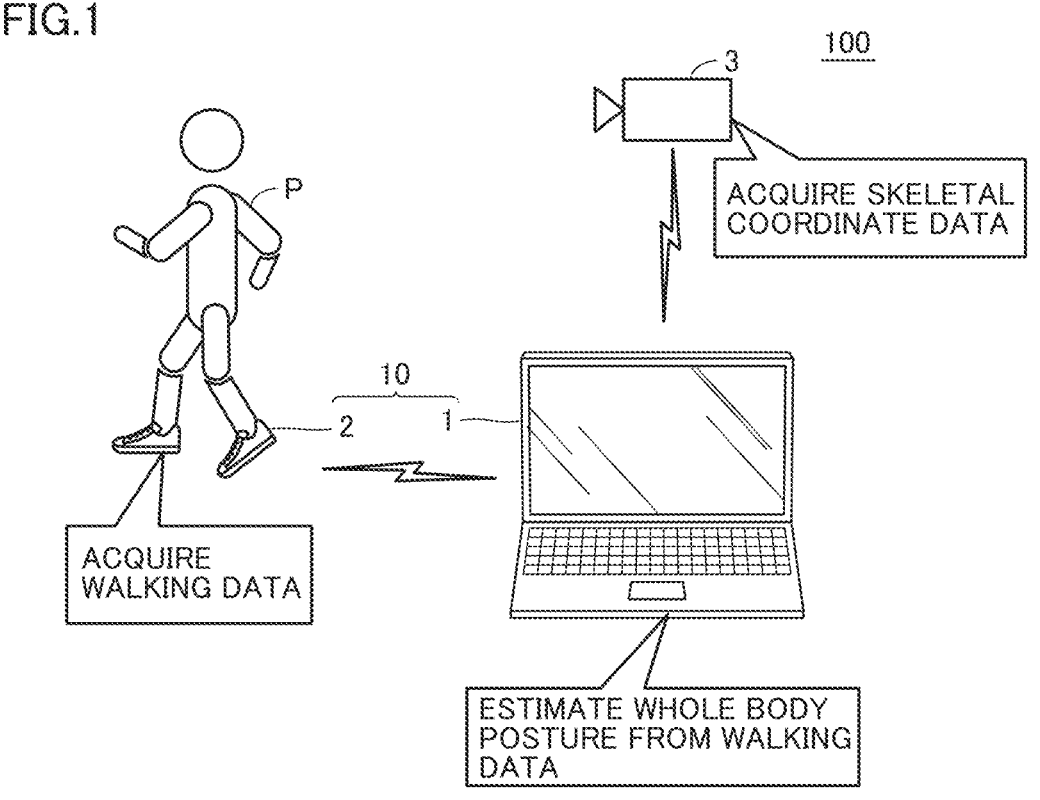
FIG. 1 is a schematic diagram illustrating a configuration of a posture estimating system including a posture estimating device according to an embodiment.

The present disclosure provides a posture estimating device, a posture estimating system, and a posture estimating method, capable of estimating a whole body posture during a predetermined motion (for example, walking motion and running motion (travelling motion)) from information of a sensor provided in a shoe. In the following description, a case where the sensor is provided in the shoe and the whole body posture during walking is estimated will be described, but the motion of the estimated whole body posture is not limited to walking, and the position where the sensor is provided is not limited to the shoe. In particular, it is preferable that a part to which the sensor is attached and a number of parts are parts and the number that do not impose a burden on the person to be measured to continuously measure on a daily basis. For example, sensors may be attached to both arms, sensors may be attached to one arm and the waist, or sensors may be attached to one arm and a shoe. Therefore, with the posture estimating device, the posture estimating system, and the posture estimating method according to the present disclosure, it is possible to grasp the whole body posture during a predetermined motion while the burden on the person to be measured is reduced in daily activities, and thus it is possible to use the posture estimating device, the posture estimating system, and the posture estimating method for improving the form of walking or running.

Hereinafter, the posture estimating device, the posture estimating system, and the posture estimating method according to embodiment will be described with reference to the drawings. In the following description, the same configuration is denoted by the same reference numeral. Names and functions of such components are also the same. Therefore, no redundant detailed description will be given of such components.

Embodiment

[Configuration of Posture Estimating System]

FIG. 1 is a schematic diagram illustrating a configuration of a posture estimating system 100 including a posture estimating device 10 according to a first embodiment. The posture estimating device 10 includes a processing device 1 (an example of a processing circuitry) that estimates a whole body posture during a predetermined motion from measurement data, and a smart shoe 2 including a sensor that measures a motion of a person to be measured P during walking or running. The posture estimating system 100 includes a posture estimating device 10 and a measuring device 3 for acquiring posture data necessary for training an estimation model for estimating a whole body posture during a predetermined motion by machine learning.

The posture estimating device 10 includes an estimation model generated in advance by training of machine learning in order to estimate the whole body posture of the person to be measured P during walking from the walking data (an example of measurement data) of the person to be measured P measured by the smart shoe 2. In other words, the estimation model is generated by training of machine learning before the estimation of the whole body posture of the person to be measured P during walking from the walking data. Therefore, in the posture estimating system 100, in order to train the estimation model, training data in which the walking data measured by the smart shoe 2 during walking is associated with the posture data acquired by the measuring device 3 for the whole body posture at the time of measuring the walking data is collected for a plurality of persons to be measured. In the present disclosure, an example of the posture estimating device 10 that trains the estimation model using the training data of the plurality of persons to be measured in the posture estimating system 100 and estimates a whole body postures of the person to be measured P by using the trained estimation model will be described.

Note that the posture estimating device 10 may use an estimation model trained with training data of the plurality of persons to be measured selected regardless of attributes (for example, sex, age, race, etc.), or may use an estimation model trained with training data of the person to be measured for each attribute. That is, the posture estimating device 10 may be configured to select an appropriate estimation model according to the attribute of the person to be measured P when the whole body posture of the person to be measured P is estimated. In addition, as will be described later, the posture estimating system 100 may calibrate an estimation model trained with training data of the plurality of persons to be measured with individual training data of the person to be measured P to generate a personalized estimation model.

Figure 2:
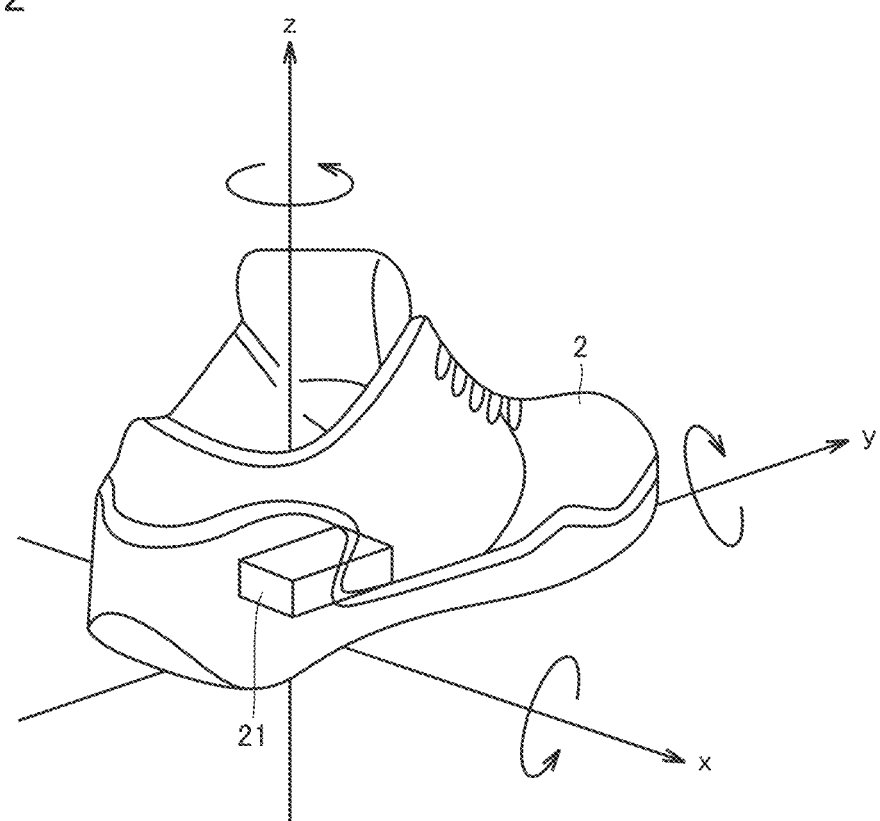
FIG. 2 is a schematic diagram for illustration of a smart shoe according to the embodiment.

First, the smart shoe 2 including a sensor that measures a motion during walking or running in the posture estimating system 100 will be described. FIG. 2 is a schematic diagram for illustration of the smart shoe 2 according to the embodiment. In the smart shoe 2 in FIG. 2, a sensor module 21 (an example of the sensor) is incorporated, and the sensor module 21 measures the walking data of the person to be measured P.

Although not illustrated, the sensor module 21 includes an acceleration sensor, an angular velocity sensor, a processing circuitry that operates walking parameters from measurement values of these sensors, and a communication circuit that wirelessly transmits the walking parameter operated by the processing circuitry and the measurement value to the processing device 1. For example, the acceleration sensor can measure accelerations of three axes of X, Y, Z, and the angular velocity sensor can measure angular velocities of the three axes of X, Y, Z. Therefore, the sensor module 21 can acquire, as the walking data of the person to be measured P, the walking parameters including a stride, a pitch, a walking speed, a time taken for one step, a stance period, a swing period, a toe angle at the time of grounding, pronation, a maximum foot height, and a landing impact on the basis of the measurement values of the acceleration sensor and the measurement value of the angular velocity sensor. Here, the landing impact is an impact applied to a foot at the time of landing, and one example of the walking parameters evaluated by a maximum value of the acceleration in a vertical direction at the time of landing. Here, the sensor module 21 can acquire, as the running data of the person to be measured P, the running parameters including a stride, a pitch, a running speed, a time taken for one step, a stance period, a swing period, a toe angle at the time of grounding, pronation, a maximum foot height, and a landing impact on the basis of the measurement values of the acceleration sensor and the measurement value of the angular velocity sensor.

Although it has been described that the data transfer of the walking parameters and the like from the sensor module 21 to the processing device 1 is performed by wireless communication, the present disclosure is not limited thereto. For example, the data transfer of the walking parameters and the like from the sensor module 21 to the processing device 1 may be performed by wired communication or by a recording medium (for example, a memory chip or a USB memory).

In addition, although it has been described that the sensor module 21 operates the walking parameter from the measurement value of the acceleration sensor and the measurement value of the angular velocity sensor, the present disclosure is not limited thereto. For example, the sensor module 21 may only transmit the measurement value of the acceleration sensor (value of the acceleration of the three axes) and the measurement value of the angular velocity sensor (value of the angular velocity of the three axes) to the processing device 1, or the processing device 1 may operate the walking parameter from the measurement value of the acceleration sensor and the measurement value of the angular velocity sensor acquired from the sensor module 21.

In the present disclosure, the smart shoe 2 in which the sensor module 21 for measuring the walking data is incorporated in the shoe will be described as an example, but the sensor module 21 for measuring the walking data of the person to be measured P may be directly attached to the leg of the person to be measured P with a supporter or the like. Furthermore, the sensor module 21 may be a portable device such as a smartphone or a smartwatch having an acceleration sensor capable of measuring the acceleration on the three axes and the angular velocity sensor capable of measuring angular velocity on the three axes.

In the posture estimating system 100, since the walking data and the posture data of the whole body posture measured at the time of measuring the walking data are required as the training data, the measuring device 3 is used to acquire the posture data.

The measuring device 3 is a motion capture camera (for example, Vicon (registered trademark), Kinect (registered trademark), and the like), and acquires skeletal coordinate data (an example of posture data) of the person to be measured P during walking using the motion capture camera. Note that the measuring device 3 is not limited to the motion capture camera, and may be configured to acquire posture data from a moving image of the person to be measured P during walking or may be configured to acquire posture data by a motion sensor.

[Configuration of Processing Device]

In the present disclosure, the processing device 1 constitutes a part of the posture estimating system 100 as a device that performs an operation for training the estimation model with the training data, and constitutes a part of the posture estimating device 10 as a device that estimates the whole body posture of the person to be measured P from the walking data using the trained estimation model.

Figure 3:
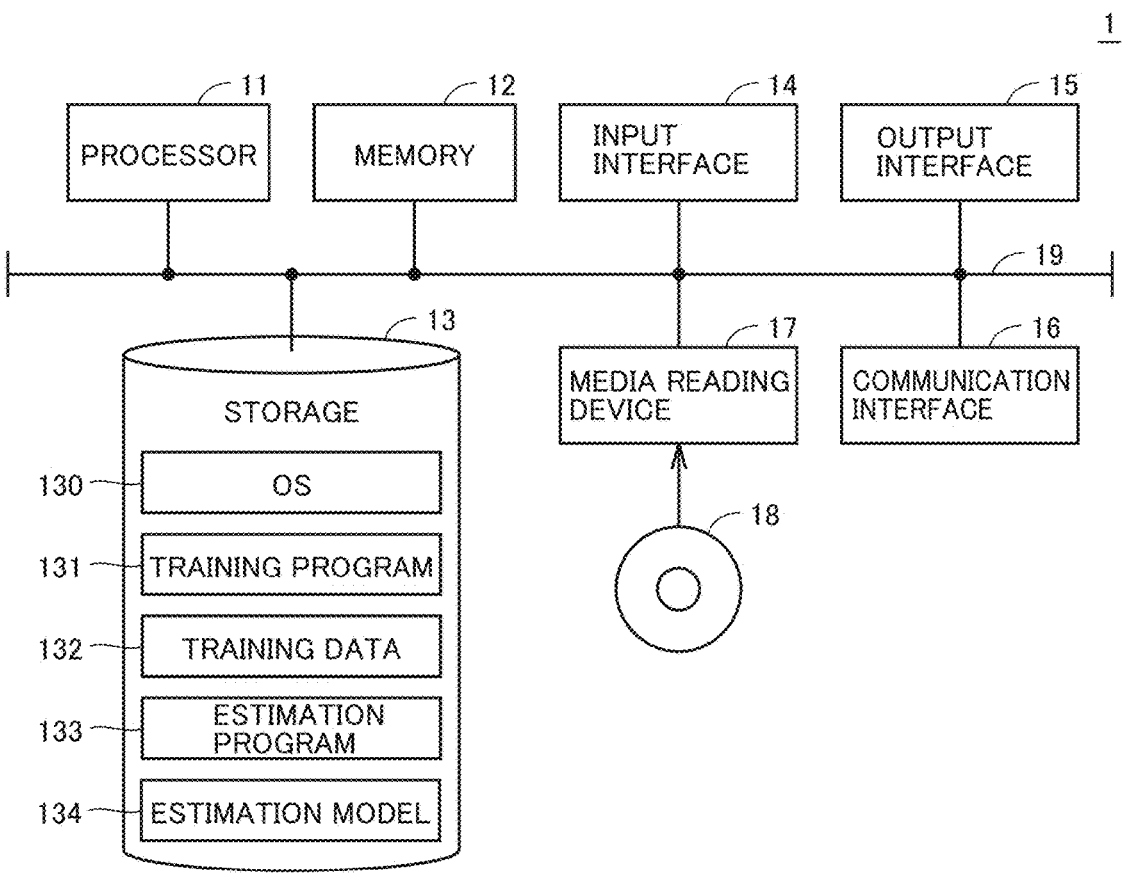
FIG. 3 is a block diagram illustrating a configuration of the posture estimating device according to the embodiment.

FIG. 3 is a block diagram illustrating a configuration of the processing device 1 of the first embodiment. As illustrated in FIG. 3, the processing device 1 includes a processor 11, a memory 12, a storage 13, an input interface 14, an output interface 15, and a communication interface 16, and a media reading device 17. These components are connected through a processor bus 19.

The processor 11 is a computer that reads a program (for example, an operating system (OS) 130, a training program 131, and an estimation program 133) stored in the storage 13, develops the read program in the memory 12, and executes the program. For example, the processor 11 includes a central processing unit (CPU), a field programmable gate array (FPGA), or a graphics processing unit (GPU), or a multi-processing unit (MPU). The processor 11 may be configured of processing circuitry.

The memory 12 includes a volatile memory such as a dynamic random access memory (DRAM) or a static random access memory (SRAM) or a nonvolatile memory such as a read only memory (ROM) or a flash memory.

The storage 13 is configured of a nonvolatile storage device such as a solid state drive (SSD) and a hard disk drive (HDD). In addition to the OS 130, the training program 131, and the estimation program 133, the storage 13 stores training data 132, an estimation model 134, and the like.

The training program 131 is a program for generating the estimation model 134 by training by machine learning using the training data 132. The estimation program 133 is a program for estimating the whole body posture of the person to be measured P from the walking data of the person to be measured P using the estimation model 134. The training program 131 and the estimation model 134 together constitute a program for executing the posture estimating method.

The input interface 14 receives input operations of a keyboard, a mouse, a touch device, and the like. The output interface 15 (an example of an output device) outputs the estimation data of the whole body posture of the person to be measured P estimated by the processing device 1 to a display, a speaker, or the like.

The communication interface 16 receives input of the walking data from the sensor module 21 and transmits and receives data to and from other devices by performing wired or wireless communication. The communication interface 16 may output information indicating the estimation data of the whole body posture of the person to be measured P that has been estimated to another device by communicating with the other device.

The media reading device 17 receives a storage medium such as a removable disk 18, a memory chip, a USB memory, or the like, and acquires data stored in the removable disk 18, the memory chip, the USB memory, or the like. Note that the media reading device 17 may read the training data stored in the removable disk 18 or may store and output the estimation data of the whole body posture of the person to be measured P that has been estimated in the removable disk 18 or the like.

Although it has been described that the processing device 1 generates the estimation model 134 by training by machine learning using the training data 132, the generalized estimation model 134 may be received from a server or the like via the communication interface 16 as long as the model is prepared in advance. Further, the processing device 1 may read the estimation model 134 stored in the removable disk 18 or the like by the media reading device 17.

Moreover, the processing device 1 constitute the posture estimating device 10 by being combined with the smart shoe 2 (sensor module 21), but the device configuration of the posture estimating device 10 is not limited thereto. For example, the device configuration of the posture estimating device 10 may be such that the processing device 1 and the sensor module 21 are integrated, or only the processing device 1 without the sensor module 21 is used.

[Posture Estimating Method]

Figure 4:
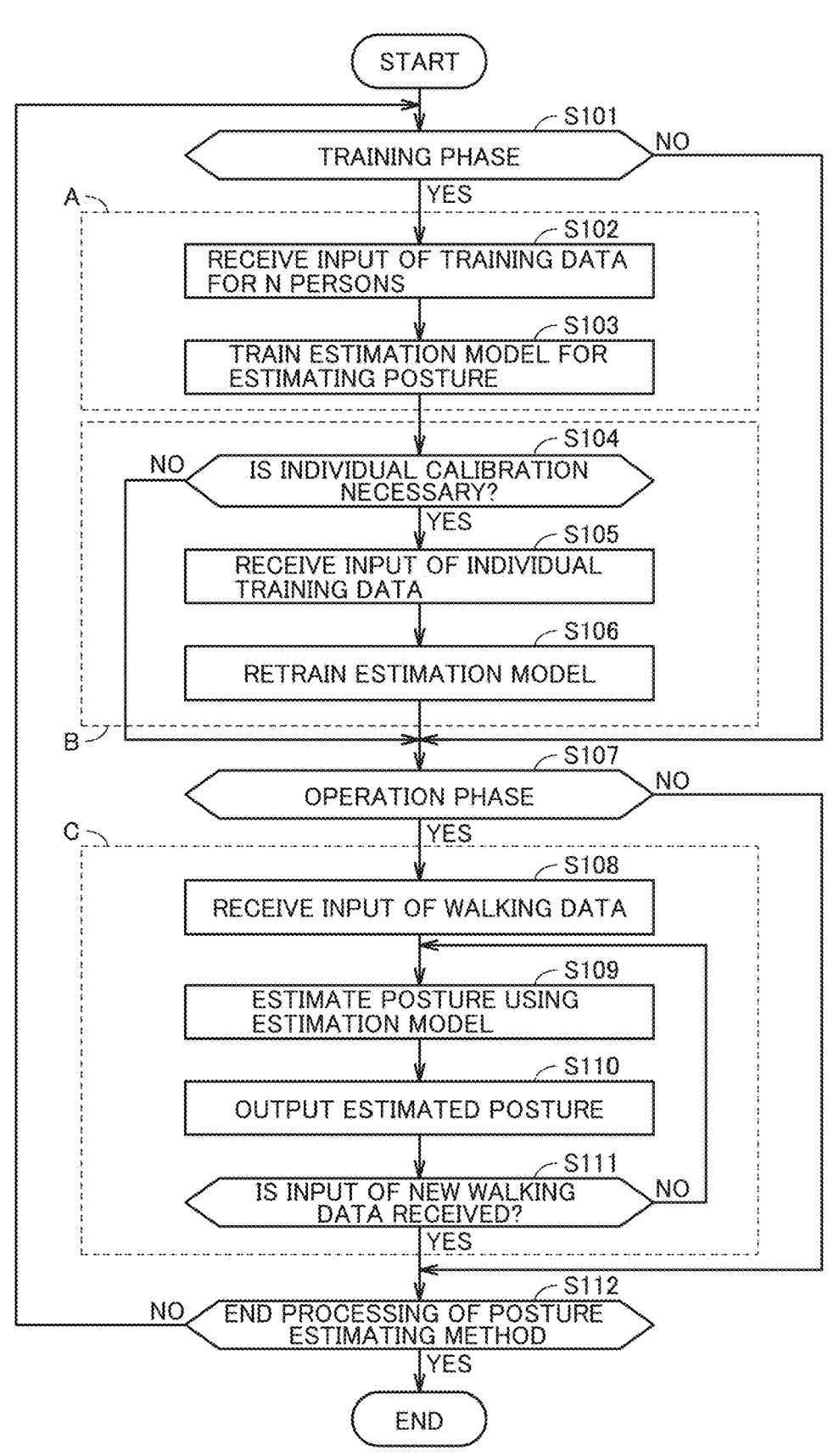
FIG. 4 is a flowchart for showing processing of a posture estimating method executed by the posture estimating system according to the embodiment.

Next, processing of the posture estimating method executed by the posture estimating system 100 will be described with reference to a flowchart. FIG. 4 is a flowchart showing processing of the posture estimating method executed by the posture estimating system 100 (particularly, the processing device 1) according to the first embodiment. Note that steps shown in FIG. 4 are realized by the processor 11 of the processing device 1 executing the training program 131 and the estimation program 133.

First, the processing device 1 determines whether or not the processing of a training phase by the training program 131 is performed (step S101). In a case where the posture estimating system 100 does not have the estimation model 134 yet, or in a case where sufficient training has not been performed on the estimation model 134, the processing device 1 performs processing of the training phase. When the processing of the training phase is not performed (NO in step S101), the processing device 1 advances the processing to step S107. On the other hand, when the processing of the training phase is performed (YES in step S101), the processing device 1 executes training phase processing A for generating the estimation model 134 for estimating the whole body posture of the person to be measured P during walking from the walking data.

Figure 5:
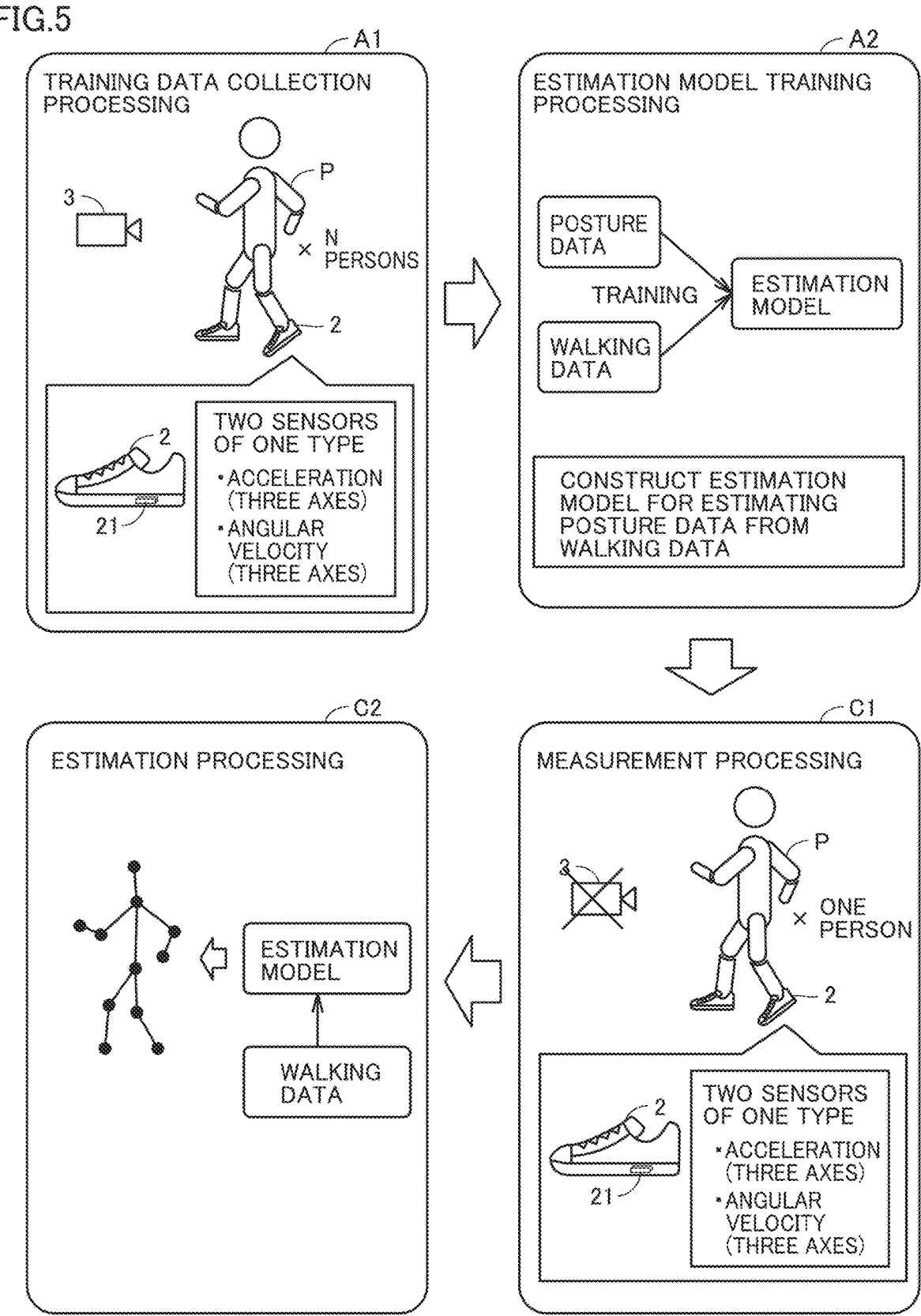
FIG. 5 is a diagram schematically illustrating a training phase and an operation phase in the posture estimating system according to the embodiment.

In the training phase processing A, an input of the training data 132 for N persons is received in order to generate the estimation model 134 (step S102). Here, the training data 132 received in step S102 includes the walking data of the person to be measured by the smart shoe 2 and the posture data acquired by the measuring device 3 of the whole body posture at the time of measuring the walking data. FIG. 5 is a diagram schematically illustrating a training phase and an operation phase in the posture estimating system according to the embodiment. As in training data collection processing A1 shown in FIG. 5, in order to input the training data 132, the N persons to be measured each wearing the smart shoe 2 are caused to walk in front of the measuring device 3, and the walking data and the posture data are acquired.

Next, the processing device 1 trains the estimation model 134 for estimating the whole body posture during walking by machine learning using the training data 132 (step S103). Here, the estimation model 134 includes, for example, a network structure such as a known neural network, support vector machine (SVM), or Bayesian network, and internal parameters used by the network structure, and the internal parameters are optimized (adjusted) by training based on the estimation data of the whole body posture estimated from the walking data of the person to be measured P and the posture data of the whole body posture at the time of measuring the walking data. As in estimation model training processing A2 illustrated in FIG. 5, the estimation model 134 is trained using the training data for the N persons in which the walking data and the posture data are associated with each other, so that the estimation model 134 that estimates the posture data (whole body posture) from the walking data is constructed.

Next, the processing device 1 determines whether or not individual calibration is performed (step S104). When the processing device 1 receives an input indicating that the personalized estimation model by the person to be measured P is not desired (NO in step S104), the processing device 1 advances the processing to step S107. On the other hand, when the processing device 1 has received an input indicating that the personalized estimation model by the person to be measured P is desired (YES in step S104), the processing device 1 executes calibration processing B for retraining the estimation model 134 with individual training data of the person to be measured P.

Figure 6:
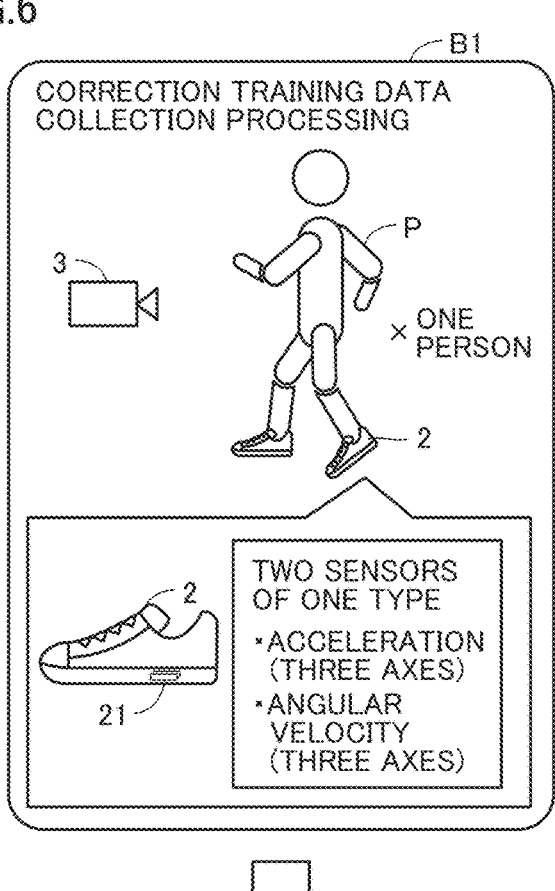
FIG. 6 is a diagram schematically illustrating a calibration phase in the posture estimating system according to the embodiment.
Figure 6:
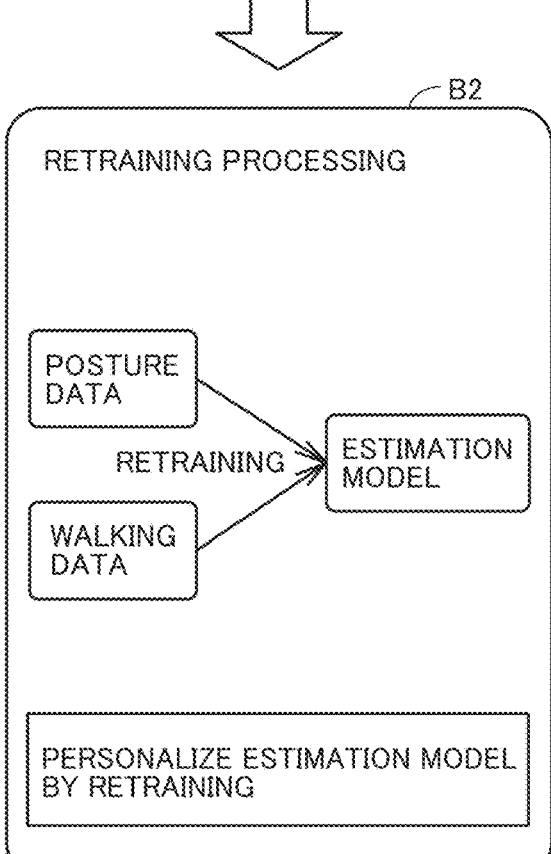

In the calibration processing B, the input of the individual training data 132 of the person to be measured P is received in order to generate the estimation model 134 (step S105). Note that the individual training data 132 of the person to be measured P received in step S105 includes the walking data of the person to be measured P himself/herself measured by the smart shoe 2 and the posture data acquired by the measuring device 3 of the whole body posture of the person to be measured P himself/herself at the time of measuring the walking data. FIG. 6 is a diagram schematically illustrating a calibration phase in the posture estimating system according to the embodiment. As in correction training data collection processing B1 illustrated in FIG. 6, in order to input the individual training data 132 of the person to be measured P, the person to be measured P who wears the smart shoe 2 walks in front of the measuring device 3, and the walking data and the posture data are acquired.

Next, the processing device 1 retrains the estimation model 134 for estimating the whole body posture by machine learning using the individual training data 132 of the person to be measured P (step S106). As in retraining processing B2 illustrated in FIG. 6, the estimation model 134 is retrained using individual training data in which the walking data of the person to be measured P and the posture data of the person to be measured P are associated with each other, so that the estimation model 134 that can accurately estimate the posture data (whole body posture) of the person to be measured P from the walking data of the person to be measured P can be constructed. That is, by retraining the estimation model 134 with the individual training data 132 of the person to be measured P, the estimation model 134 can be personalized for the person to be measured P.

Next, the processing device 1 determines whether or not the processing of the operation phase by the estimation program 133 is performed (step S107). In a case where the sufficiently trained estimation model 134 is generated in the training phase processing A, or in a case where the estimation model 134 personalized for the person to be measured P is generated in the calibration processing B, the processing device 1 performs the process of the operation phase. When the processing of the operation phase is not performed (NO in step S107), the processing device 1 advances the processing to step S112. On the other hand, when the processing of the operation phase is performed (YES in step S107), the processing device 1 executes operation phase processing C of estimating the whole body posture of the person to be measured P during walking only from the walking data using the estimation model 134.

In the operation phase processing C, the input of the walking data of the person to be measured P is received in order to estimate the whole body posture of the person to be measured P during walking (step S108). In step S108, only the walking data sent from the smart shoe 2 (sensor module 21) of the person to be measured P is required, and thus the measuring device 3 is unnecessary. As in measurement processing C1 illustrated in FIG. 5, in order to input the walking data of the person to be measured P, the person to be measured P wearing the smart shoe 2 is caused to walk, and the input of the walking data sent from the smart shoe 2 is received by the processing device 1. Although the processing device 1 illustrated in FIG. 1 is a notebook computer, in the operation phase processing C, the trained estimation model 134 may be stored in a smartphone, the smartphone may be used as the processing device 1 to receive input of walking data sent from the smart shoe 2, and the whole body posture of the person to be measured P during walking may be estimated.

Next, the processing device 1 estimates the whole body posture of the person to be measured P during walking from the walking data of the person to be measured P using the estimation model 134 (step S109). The processing device 1 displays skeletal coordinate data (an example of the estimation data) of the whole body posture of the person to be measured P during walking estimated in step S109 on a display connected to the processing device 1 as an image. As in estimation processing C2 illustrated in FIG. 5, by inputting the walking data of the person to be measured P to the estimation model 134, the skeletal coordinate data obtained by estimating the whole body posture of the person to be measured P during walking is displayed as an image on the display.

The processing device 1 determines whether or not an input of new walking data has been received from the smart shoe 2 (step S111). Since the processing device 1 sequentially estimates the whole body posture of the person to be measured P based on the walking data, the processing device 1 updates skeletal coordinate data of the person to be measured P estimated based on the newly input walking data. Therefore, when the input of new walking data is received (YES in step S111), the processing device 1 returns the processing to step S109, and estimates the whole body posture of the person to be measured P during walking from the new walking data.

On the other hand, when the input of new walking data has not been received (NO in step S111), the processing device 1 determines whether or not the processing of the posture estimating method is finished (step S112). When the processing device 1 has not received an input for ending the processing of the posture estimating method (NO in step S112), the processing device 1 returns the processing to step S101. On the other hand, when the processing device 1 receives an input to end the processing of the posture estimating method (YES in step S112), the processing device 1 ends the processing of the posture estimating method.

Next, the processing of the posture estimating method will be described in more detail. In the present disclosure, estimating the whole body posture during the walking operation from the walking data acquired from the smart shoe 2 will be described. However, in the processing of the posture estimating method, the target of the motion for estimating the whole body posture is not limited to the walking motion, and the present invention can be similarly applied to any motion in which the whole body cooperatively moves (for example, a locomotion such as running).

Furthermore, even in a motion other than the motion in which the whole body cooperatively moves, for example, the posture of the lower body is estimated from the walking data acquired from the smart shoe 2, and the posture of the upper body is estimated from the measurement data acquired from another sensor attached to the arm or the upper body, and thus the whole body posture during the motion in which the lower body and the upper body are not cooperatively moved can be estimated. This is because, in the processing of the posture estimating method, the estimation model 134 in which the correspondence relationship between the posture data of the whole body posture during the predetermined motion and the measurement data of the sensor attached to a certain part of the body is trained by machine learning is generated in the training phase processing A, and the whole body posture during the predetermined motion can be estimated from the measurement data of the sensor attached to a certain part of the body using the estimation model 134 in the operation phase processing C.

Figure 7:
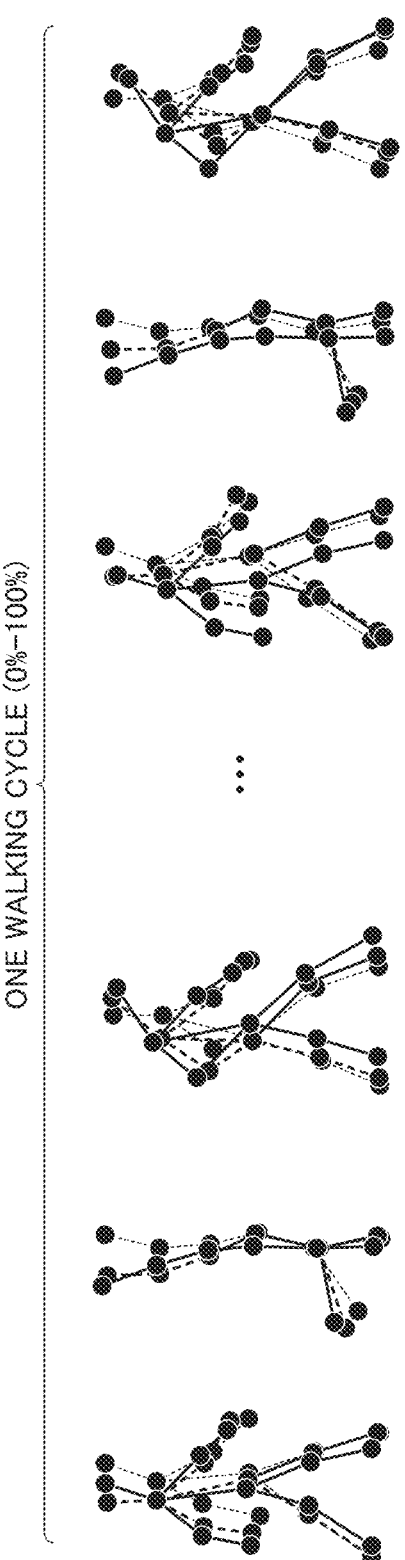
FIG. 7 is a schematic diagram for illustration of one walking cycle.

First, when the object of the motion for estimating the whole body posture is a walking motion, the posture data of the person to be measured is acquired by the measuring device 3 (motion capture camera) in units of one walking cycle. FIG. 7 is a schematic diagram for illustration of one walking cycle. In FIG. 7, a series of motions from the heel grounding timing of the left foot of the person to be measured to the heel grounding timing of the left foot via the heel grounding timing of the right foot is set as one walking cycle. The walking motion is a motion of repeating motions of the pattern illustrated in FIG. 7. Further, the whole body posture of the person to be measured is expressed as skeletal coordinate data of 21 points which are feature points. The person to be measured Performs a walking motion (walking of about 1 m to 4.5 m) in one walking cycle at a position about 5 m away from the measuring device 3, and the measuring device 3 acquires three-dimensional coordinates of 21 points of the whole body posture as data for 101 frames. Note that expressing the skeletal coordinate data as 21 body parts is an example, and the number of points may be increased from 21 points if more accurate information of the whole body posture is obtained, and the number of points may be decreased from 21 points if arithmetic processing is further reduced. Similarly, acquiring one walking cycle as data for 101 frames is an example, and the number of frames may be increased from 101 frames if more accurate information on the whole body posture is obtained, and the number of frames may be decreased from 101 frames if the arithmetic processing is further reduced.

In the above example, the skeletal coordinate data is 6363 pieces of data in 21 points×3 coordinates×101 frames. However, in a case where the 6363 pieces of data are directly adopted as training data, a burden of arithmetic processing is large, and therefore dimension reduction by main component analysis is performed. At this point, the main component analysis is one of statistical methods for synthesizing a variable (main component) that represents the most variation of the whole with a small number of uncorrelated variables from a large number of correlated variables and dimensionally compressing the same. Of course, 6363 pieces of data may be adopted as it is as the training data if the burden of the arithmetic processing is not considered.

More specifically, the dimension reduction processing of the skeletal coordinate data will be described. The processing device 1 extracts data of one walking cycle for skeletal coordinate data of the motion of each of the N persons acquired from the measuring device 3, resamples one walking cycle to 0%-100%, and normalizes time. That is, the processing device 1 normalizes one walking cycle as skeletal coordinate data of 101 frames. In addition, the processing device 1 obtains a sum of distances from a certain reference coordinate to individual coordinates as a norm (norm) d, and divides the individual coordinates by the norm d to normalize the position. The processing device 1 performs the main component analysis on the 6363 pieces of skeletal coordinate data obtained in this way, and performs the dimension reduction to compress the principal component (variable) for explaining the walking motion into information of a component (for example, 16 variables) having a high contribution degree (for example, greater than or equal to 95%). That is, the processing device 1 calculates 6363 pieces of the skeletal coordinate data as posture data dimensionally compressed into 16 components (variables). Of course, the number of components of the main component analysis with respect to the skeletal coordinate data is an example, and is not limited to 16 components.

In the present disclosure, the posture data dimensionally compressed into the 16 components and the walking data corresponding to the posture data are adopted as training data. As the walking data, 10 walking parameters of a stride, a pitch, a walking speed, a time taken for one step, a stance period, a swing period, a toe angle at the time of grounding, pronation, a maximum foot height, and a walking parameter of a landing impact are adopted. Of course, the walking data may not be the 10 walking parameters, but may be the measurement value of the acceleration sensor and the measurement value of the angular velocity sensor. Note that, by adopting the 10 walking parameters for the walking data, the load of the arithmetic processing is reduced, and the machine learning of the estimation model is performed on the basis of the walking parameter indicating the feature of the walking motion, so that the estimation model is easily converged. Furthermore, the 10 walking parameters are an example, and fewer walking parameters may be used as the walking data, and more walking parameters may be used as the walking data.

Figure 8:
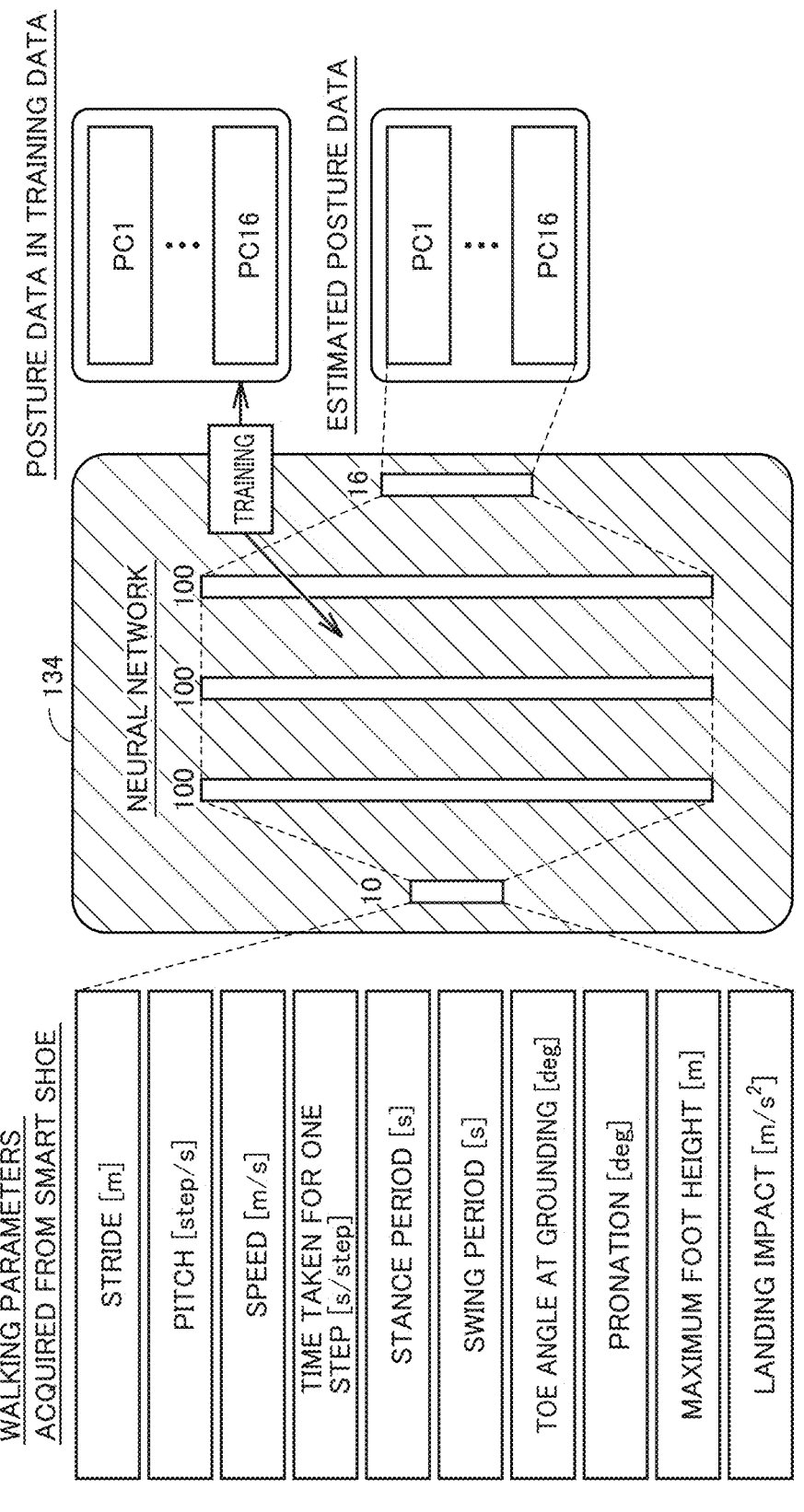
FIG. 8 is a diagram schematically illustrating an operation of an estimation model in the posture estimating system according to the embodiment.

FIG. 8 is a diagram schematically illustrating the operation of the estimation model in the posture estimating system 100 according to the embodiment. As illustrated in FIG. 8, the posture estimating system 100 estimates the posture data of the 10 walking parameters using the estimation model 134 from walking data including 16 components. Here, the estimation model 134 has a neural network structure including three layers of 100 dimensional fully connected layers. In the posture estimating system 100, the machine learning is performed such that a loss function between the posture data of 16 components of the training data and the posture data of 16 components that have been estimated is minimized, and the trained estimation model 134 is constructed.

By using the trained estimation model 134, the posture estimating device 10 can estimate the posture data of 16 components from the walking data of the person to be measured P measured by the sensor module 21, and reconstructs skeletal coordinates from the 16 components that have been estimated to obtain the skeletal coordinate data of the whole body posture of the person to be measured P as estimation data. Thus, by using the trained estimation model 134, the posture estimating device 10 can continuously grasp the whole body posture of the person to be measured P during walking on a daily basis only by the person to be measured P walking in the smart shoe 2 without using the measuring device 3 (motion capture camera).

Figure 9:
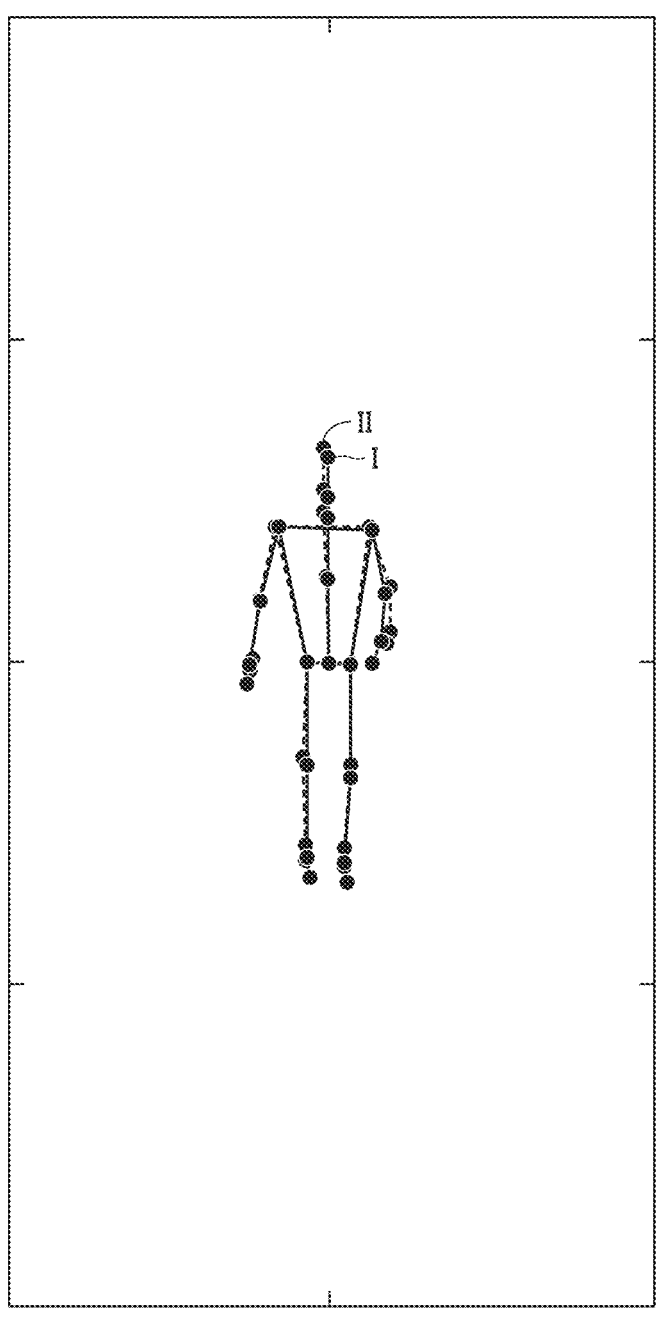
FIG. 9 is a diagram illustrating skeletal coordinate data of a whole body estimated from the front by the posture estimating device according to the embodiment.
Figure 10:
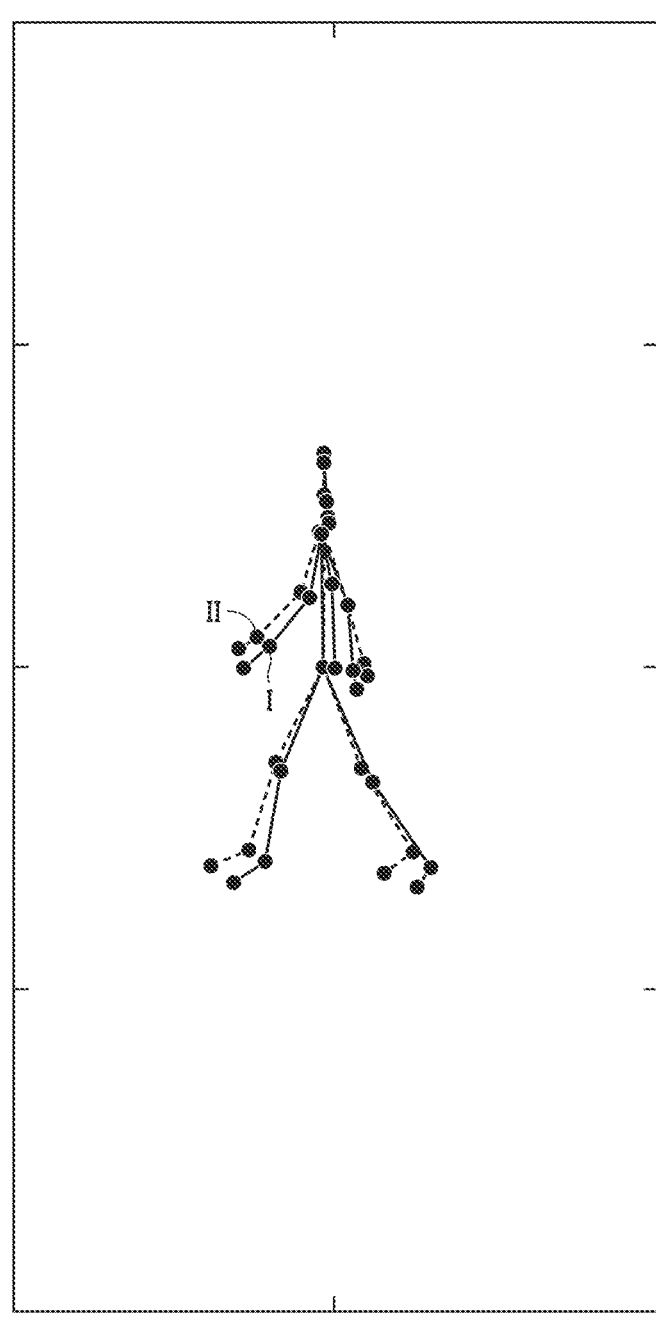
FIG. 10 is a diagram illustrating the skeletal coordinate data of the whole body estimated from the side by the posture estimating device according to the embodiment.

The accuracy of the whole body posture of the person to be measured P during walking estimated by the posture estimating device 10 using the trained estimation model 134 will be described. FIG. 9 is a diagram illustrating skeletal coordinate data of a whole body estimated from the front by the posture estimating device 10 according to the embodiment. FIG. 10 is a diagram illustrating skeletal coordinate data of a whole body estimated from the side by the posture estimating device 10 according to the embodiment. In FIGS. 9 and 10, skeletal coordinate data I of the whole body posture of the person to be measured P estimated by the posture estimating device 10 is indicated by a solid line. In FIGS. 9 and 10, skeletal coordinate data II of the whole body posture of the person to be measured P measured by the measuring device 3 is indicated by a broken line as a comparison target.

In FIG. 9 displayed from the front, there is no difference between the skeletal coordinate data I of the solid line and the skeletal coordinate data II of the broken line, and it can be seen that the posture estimating device 10 accurately estimates the skeletal coordinate data I of the person to be measured P. On the other hand, in FIG. 10 displayed from the side, it can be seen that the posture estimating device 10 appropriately estimates the skeletal coordinate data I of the person to be measured P although there is a difference in arms and legs when comparing the skeletal coordinate data I of the solid line with the skeletal coordinate data II of the broken line.

Figure 11:
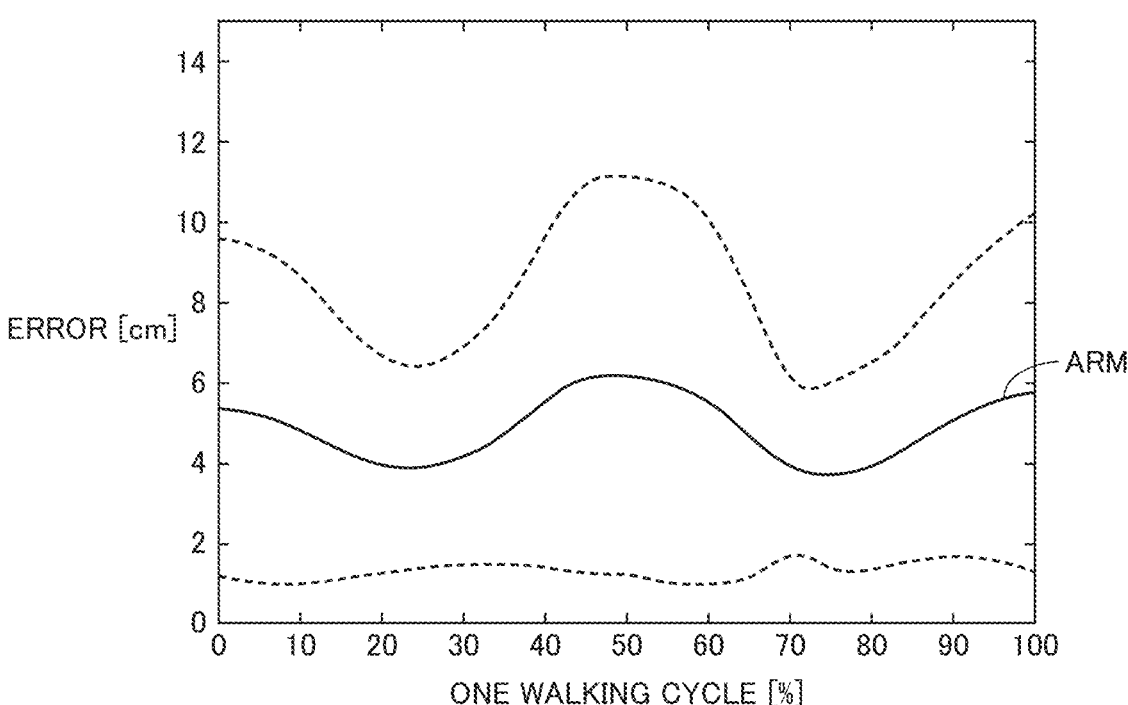
FIG. 11 is a graph showing a change in an error in one walking cycle of the skeletal coordinate data of an arm estimated by the posture estimating device according to the embodiment.
Figure 12:
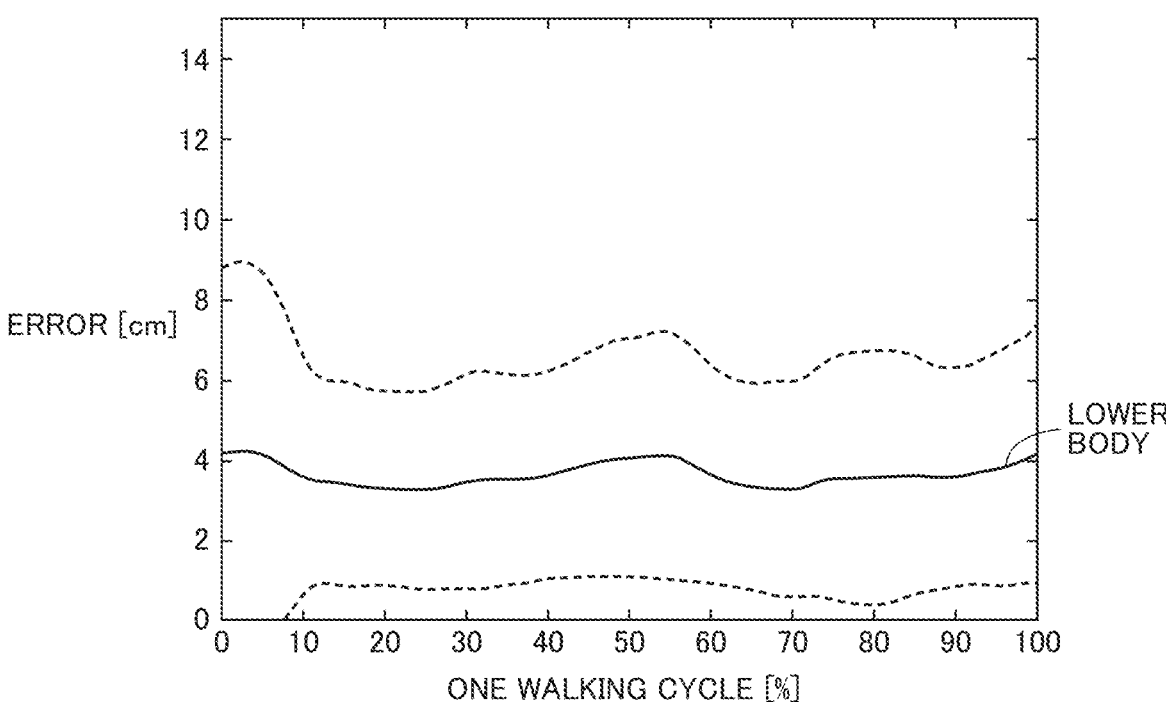
FIG. 12 is a graph showing a change in an error in one walking cycle of the skeletal coordinate data of a lower body estimated by the posture estimating device according to the embodiment.
Figure 13:
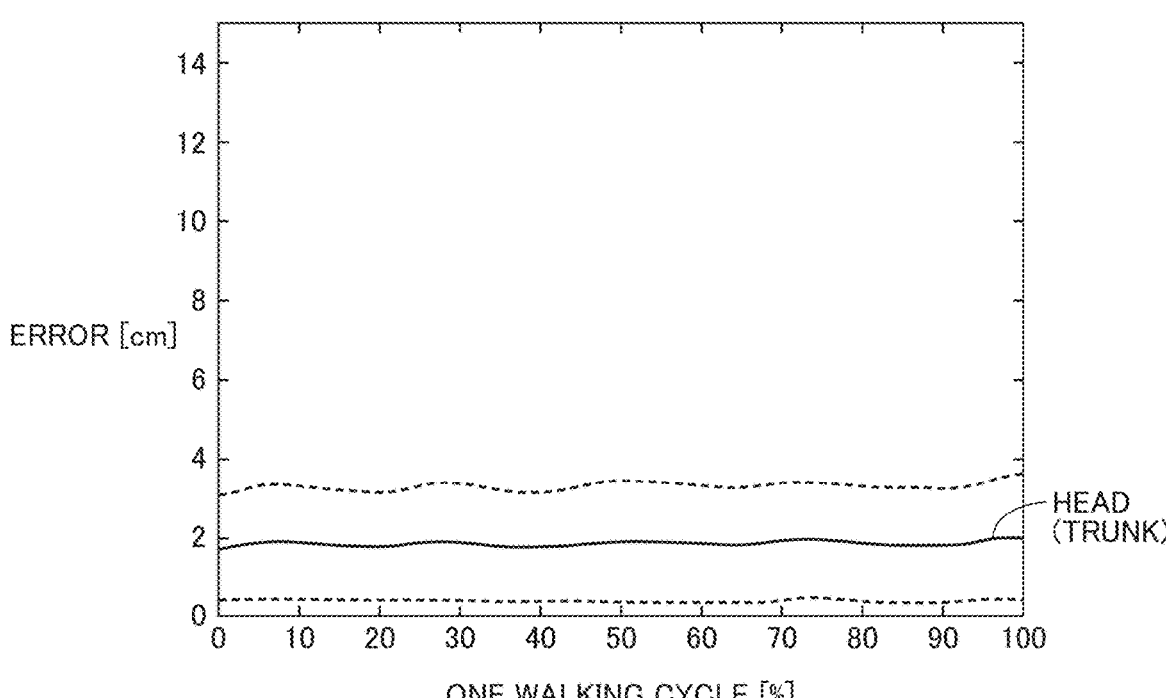
FIG. 13 is a graph showing a change in an error in one walking cycle of the skeletal coordinate data of the head estimated by the posture estimating device according to the embodiment.

More specifically, the accuracy of the whole body posture of the person to be measured P estimated by the posture estimating device 10 will be described. FIG. 11 is a graph showing a change in an error in one walking cycle of the skeletal coordinate data of the arm estimated by the posture estimating device 10 according to the embodiment. FIG. 12 is a graph showing a change in an error in one walking cycle of the skeletal coordinate data of the lower body estimated by the posture estimating device 10 according to the embodiment. FIG. 13 is a graph showing a change in an error in one walking cycle of the skeletal coordinate data of the head estimated by the posture estimating device 10 according to the embodiment.

The graphs illustrated in FIGS. 11 to 13 illustrate results of performing accuracy verification by comparing the feature points (21 points) of the whole body posture of the person to be measured P estimated by the posture estimating device 10 with the feature points (21 points) of the whole body posture of the person to be measured P measured by the measuring device 3. In the graphs illustrated in FIGS. 11 to 13, the horizontal axis represents one walking cycle, and the vertical axis represents an error (Error). In the graphs illustrated in FIGS. 11 to 13, the average error of each of the arm, the lower body, and the head (trunk) is indicated by a solid line, and the standard deviation of each is indicated by a broken line. In the posture estimating device 10, since the whole body posture is estimated only from the information of the sensor module 21 provided in the smart shoe 2, there is a possibility that a difference in accuracy may be seen with respect to the body part. Therefore, the average error is obtained by dividing the feature points (21 points) of the whole body posture into three parts of the head (trunk), the lower body, and the arm, and the graphs of FIGS. 11 to 13 are illustrated in order to verify the temporal change of the error.

From the graphs illustrated in FIGS. 11 to 13, the average error of all the feature points (21 points) in the whole body posture was 3.8 cm (standard deviation: 3.3 cm), and a highly accurate result was obtained. The average error of the arm shown in FIG. 11, in which the largest error was observed, was 7.6 cm (standard deviation: 4.5 cm). Note that the average stride length was about 70 cm, and the error with respect to the stride length estimated by the posture estimating device 10 was about 5%. It has been found that the error of the feature point estimated by the posture estimating device 10 is larger in the order of the arm, the lower body, and the head (trunk), and the error of the feature point of the lower body and the feature point of the arm has a peak value at the grounding timing of the foot.

Modification (1) In the above-described embodiment, the posture estimating device 10 estimates the skeletal coordinate data (an example of the estimation data) of the whole body posture during walking from the walking data (an example of the measurement data) of the sensor module 21, but the skeletal coordinate data to be estimated may be a part of the body such as the lower body or the upper body.

(2) In the above-described embodiment, the motion of the person to be measured is measured with the smart shoe 2 in which the sensor module 21 (including the three-axial acceleration sensor and the three-axial angular velocity sensor) is incorporated in the shoe. However, the position to which the sensor module 21 is attached may be any position as long as the position moves in accordance with the motion of the person to be measured. Furthermore, in the above-described embodiment, a total of two of the sensor modules 21 in which the sensors of one type are provided respectively in the left and right shoes are used. However, one sensor module 21 provided in any one of the left and right shoes may be used, or a plurality of sensors of different types may be used. Furthermore, a total of two sensor modules 21 may be provided in each of the left and right shoes, and the posture estimating device 10 may be configured to use measurement data from one of the sensor modules 21.

(3) In the above-described embodiment, the 10 walking parameters (also referred to as gait indexes) that can be acquired from the sensor module 21 are used as the walking data. However, any data may be used as long as the walking data is derived from the three-axial acceleration sensor and the three-axial angular velocity sensor, and the values themselves of the three-axial acceleration sensor and the three-axial angular velocity sensor may be used.

(4) In the above-described embodiment, it has been described that the object of the motion for estimating the whole body posture is the walking motion. However, the present invention can be similarly applied to a motion in which the whole body cooperatively moves (for example, a locomotion such as running). In addition, even in a specific motion (for example, a motion with periodicity such as a golf swing, and the like) other than the motion in which the whole body moves in conjunction with each other, for example, if the sensor module 21 is provided for each of the foot and the arm to create training data, and the estimation model is trained, the whole body posture in the specific motion can be estimated.

(5) In the above-described embodiment, it has been described that the whole body posture of the person to be measured P during walking estimated in the operation phase processing C is displayed on the display as an image. However, in addition to the image, the whole body posture of the person to be measured P may be fed back to the person to be measured P by outputting the whole body posture of the person to be measured P as sound from a speaker or outputting the whole body posture of the person to be measured P as vibration using a vibration mechanism.

(6) In the above-described embodiment, the posture data is regressed from the walking data acquired from the smart shoe 2 using the estimation model 134 having the neural network structure, but other machine learning methods other than the neural network structure may be used.

(7) In the above-described embodiment, the posture estimating device 10 estimates the whole body posture of the person to be measured P from the walking data acquired from the smart shoe 2, but may estimate the whole body posture of the person to be measured P during the predetermined motion from the measurement data of the motion of the person to be measured P acquired from a device (for example, a smartphone, a smart watch, or the like incorporating a three-axial acceleration sensor and a three-axial angular velocity sensor) other than the smart shoe 2. The posture estimating device 10 may combine the smart shoe 2 with a device such as a smartphone or a smart watch to estimate the whole body posture of the person to be measured P during the predetermined motion from the measurement data of the motion of the person to be measured P.

(8) In the above-described embodiment, for convenience, it has been described that both the training data 132 and the walking data of the person to be measured P are acquired using the smart shoe 2 including the sensor module 21, but the training data 132 and the sensor for acquiring the walking data of the person to be measured P may be different from each other.

Aspects (1) A posture estimating device according to the present disclosure is a posture estimating device that estimates a whole body posture of a person to be measured during a predetermined motion, the posture estimating device including:

at least one sensor attached to the person to be measured, the at least one sensor acquiring measurement data based on an acceleration of three axes and an angular velocity of the three axes at at least one location of the person to be measured;

a processing circuitry that estimates, using an estimation model trained by machine learning, the whole body posture of the person to be measured during the predetermined motion from the measurement data acquired by the sensor; and an output device that outputs estimation data of the whole body posture of the person to be measured that has been estimated by the processing circuitry, in which the estimation model is generated in advance by training by machine learning based on the measurement data acquired by the sensor during the predetermined motion and based on posture data obtained by measuring the whole body posture of the person to be measured at a timing when the measurement data is acquired.

With the above configuration, the posture estimating device according to the present disclosure estimates the whole body posture of the person to be measured during the predetermined motion from the measurement data acquired by the sensor using the estimation model trained by machine learning, and therefore it is possible to continuously grasp the whole body posture on a daily basis with a small number of sensors.

(2) In the posture estimating device according to (1), the estimation model is retrained by machine learning for each of persons to be measured who uses the posture estimating device.

(3) In the posture estimating device according to (1) or (2), the predetermined motion is a motion in which a whole body of the person to be measured moves in conjunction with a motion of a location of the person to be measured to which the sensor is attached.

(4) In the posture estimating device according to any one of (1) to (3), the sensor is provided in a shoe used by the person to be measured.

(5) In the posture estimating device according to (4), the sensor acquires a plurality of parameters based on one of walking or running of the person to be measured as the measurement data, the plurality of parameters being obtained from the acceleration of the three axes and the angular velocity of the three axes.

(6) In the posture estimating device according to (5), the plurality of parameters based on the one of walking or running of the person to be measured include at least one parameter among a stride, a pitch, a walking speed or a running speed, a time taken for one step, a stance period, a swing period, a toe angle at a time of grounding, a pronation, a maximum foot height, and a landing impact.

(7) A posture estimating system according to the present disclosure includes: a measuring device that measures the posture data; and the posture estimating device according to any one of (1) to (6), in which the posture data measured by the measuring device is used when the estimation model is trained by machine learning.

(8) The posture estimating system according to (7), in which the measuring device is a motion capture camera, and the posture data is skeletal coordinate data acquired using the motion capture camera.

(9) The posture estimating system according to (8), in which the estimation model is trained by machine learning using the skeletal coordinate data dimensionally compressed by main component analysis.

(10) A posture estimating method according to the present disclosure is a posture estimating method for estimating a whole body posture of a person to be measured during a predetermined motion, the posture estimating method including:

acquiring, from at least one sensor attached to the person to be measured, measurement data based on an acceleration of three axes and an angular velocity of the three axes at at least one location of the person to be measured;

estimating, using an estimation model trained by machine learning, the whole body posture of the person to be measured during the predetermined motion from the measurement data acquired by the sensor; and outputting estimation data of the whole body posture of the person to be measured that has been estimated, in which the estimation model is generated in advance by training by machine learning based on the measurement data acquired by the sensor during the predetermined motion and based on posture data obtained by measuring the whole body posture of the person to be measured at a timing when the measurement data is acquired.

Although the embodiments of the present invention have been described, it should be considered that the disclosed embodiment is an example in all respects and not restrictive. The scope of the present invention is indicated by the claims, and it is intended that all modifications within the meaning and scope of the claims are included in the present invention.

What is claimed is:

1. A posture estimating device that estimates a whole body posture of a person to be measured during a predetermined motion, the posture estimating device comprising:

a first sensor configured to be disposed in a shoe to acquire measurement data of an acceleration of three axes of a foot of the person to be measured and an angular velocity of three axes of the foot of the person to be measured;

a processing circuitry configured to estimate, using an estimation model trained by machine learning on training data of representative acceleration of three axes of feet of a plurality of persons during the predetermined motion, representative angular velocity of three axes of the feet of the plurality of persons during the predetermined motion, and whole body postures of the plurality of persons during the predetermined motion, the whole body posture of the person to be measured during the predetermined motion from the measurement data acquired by a second sensor configured to measure the whole body posture of the person; and an output configured to output estimation data of the whole body posture of the person to be measured that has been estimated by the processing circuitry.

2. The posture estimating device according to claim 1, wherein the estimation model is retrained by machine learning for each of persons to be measured who uses the posture estimating device.

3. The posture estimating device according to claim 1, wherein the predetermined motion is a motion in which a whole body of the person to be measured moves in conjunction with a motion of the foot of the person to be measured to which the first sensor is attached.

4. The posture estimating device according to claim 1, wherein the first sensor is configured to acquire a plurality of parameters based on one of walking or running of the person to be measured based on the measurement data.

5. The posture estimating device according to claim 4, wherein the plurality of parameters includes at least one parameter among a stride, a pitch, a walking speed or a running speed, a time taken for one step, a stance period, a swing period, a toe angle at a time of grounding, a pronation, a maximum foot height, and a landing impact.

6. The posture estimating device according to claim 1, further comprising:

the second sensor configured to measure posture data of the whole body posture of the person to be measured at a timing when the measurement data is acquired, wherein the posture data measured by the second sensor is used when the estimation model is trained by machine learning.

7. The posture estimating device according to claim 6, wherein the second sensor is a motion capture camera, and the posture data is skeletal coordinate data acquired using the motion capture camera.

8. The posture estimating device according to claim 7, wherein the estimation model is trained by machine learning using the skeletal coordinate data dimensionally compressed by main component analysis.

9. A posture estimating method for estimating a whole body posture of a person to be measured during a predetermined motion, the posture estimating method comprising:

acquiring, from a first sensor configured to be disposed in a shoe, measurement data of an acceleration of three axes of a foot of the person to be measured and an angular velocity of three axes of the foot of the person to be measured;

estimating, using an estimation model trained by machine learning on training data of representative acceleration of three axes of feet of a plurality of persons during the predetermined motion, representative angular velocity of three axes of the feet of the plurality of persons during the predetermined motion, and whole body postures of the plurality of persons during the predetermined motion, the whole body posture of the person to be measured during the predetermined motion from the measurement data acquired a second sensor configured to measure the whole body posture of the person; and outputting estimation data of the whole body posture of the person to be measured that has been estimated.

* * * * *